United States Patent [19]

Azurin

[11] 4,092,797
[45] June 6, 1978

[54] FISH TRAPPING DEVICE

[76] Inventor: Salvador R. Azurin, Bigaa, Legaspi City, Philippines

[21] Appl. No.: 725,000

[22] Filed: Sep. 20, 1976

[51] Int. Cl.² ............................................. A01K 71/00
[52] U.S. Cl. ........................................ 43/102; 43/105
[58] Field of Search .................. 43/102, 100, 103, 105

[56] References Cited

U.S. PATENT DOCUMENTS

| 1,336,356 | 4/1920 | Johnson | 43/105 |
| 2,728,164 | 12/1955 | Mears | 43/105 |
| 2,908,993 | 10/1959 | Webb et al. | 43/102 |
| 3,852,908 | 12/1974 | Christopher | 43/102 |

FOREIGN PATENT DOCUMENTS 45,014  10/1888  Germany ........................ 43/105

*Primary Examiner*—Edgar S. Burr
*Assistant Examiner*—Daniel J. Leach
*Attorney, Agent, or Firm*—Bucknam and Archer

[57] ABSTRACT

A fishing device having a cup-shaped net or a cylindrical net with one end totally closed and the opened mouth attached to an inflatable circular tube with hooks and rings whereby a rope can pass through so that when said tube is deflated said rope will constrict the mouth of said net when pulled from the surface of the water, said floatable tube further containing exhaust nozzles whereby a fluid can discharge in order to cause a propulsive action to the said tube.

3 Claims, 8 Drawing Figures

4,092,797

FISH TRAPPING DEVICE

BACKGROUND OF THE INVENTION

This invention relates to a fishing device and more particularly to a floatable fishing device using a ringed collapsible tube with the opened mouth of the fishing net attached underneath by means of hooks and rings, said collapsible tube having a tube coupler with nozzles whereby a pumped liquid can discharge in order to create a propulsive motion to said tube.

This is an improvement over my existing Philippine Pat. No. 8494, issued July 23, 1974.

There are several fishing devices using air as means of trapping fishes and this is done by using compressed air and discharging said air by means of a flexible hose and nozzle to the area where fishes are suspected to dwell. The disturbed fishes naturally go out their hiding places and try to escape to other safe places. In their escape, however, they are caught by the fisherman's net.

Another type is the water pumping method wherein the fish is lured to a certain area by means of a fish caller or an undersea cinema simulating the view and sound of a school of fish. When in the vicinity of the specified area a high capacity water pump is operated and the areas with the lured fish are forcibly sucked and passed on a screen on the boat's deck. The pump fishes are then collected from the screening area and stored.

This manner of fishing may also be banned due to the fact that small fishes are also sucked and forcibly compressed to death due to the pressure of the fluid.

In order to remedy the disadvantages of the prior art, I therefore provide for a fishing device using also air and water in order to effectively catch fish. This is accomplished by having a cupped-shaped fishing net or a cylindrical fishing net with one end thereof totally closed and on the open mouth is attached a ringed collapsible tube with rope that will close the opened mouth of said net as the tube is deflated. Furthermore, said tube is provided with a liquid discharge nozzle that will provide a propulsive action as pressurized liquid discharges from said nozzles.

OBJECTIVES

The objects of this invention are as follows:
a. to provide a fishing device that sinks when in a deflated condition and floats when inflated;
b. to provide a fishing device with a cup-shaped or cylindrical with closed bottom fishing net whose opened mouth is attached to a collapsible tube that can be inflated by means of compressed air in order to cause said net to float;
c. to provide a fishing device with floatable means operated by air and propelled by a discharging pressurized liquid; and
d. to provide a fishing device that is selective to the size of the fish and can be adapted to act as a stationary fish fence.

Other objects and advantages will be well understood by the man skilled in the art upon reading the following specification taken in conjunction with the accompanying drawings.

DETAILED DESCRIPTION

Figure 1:
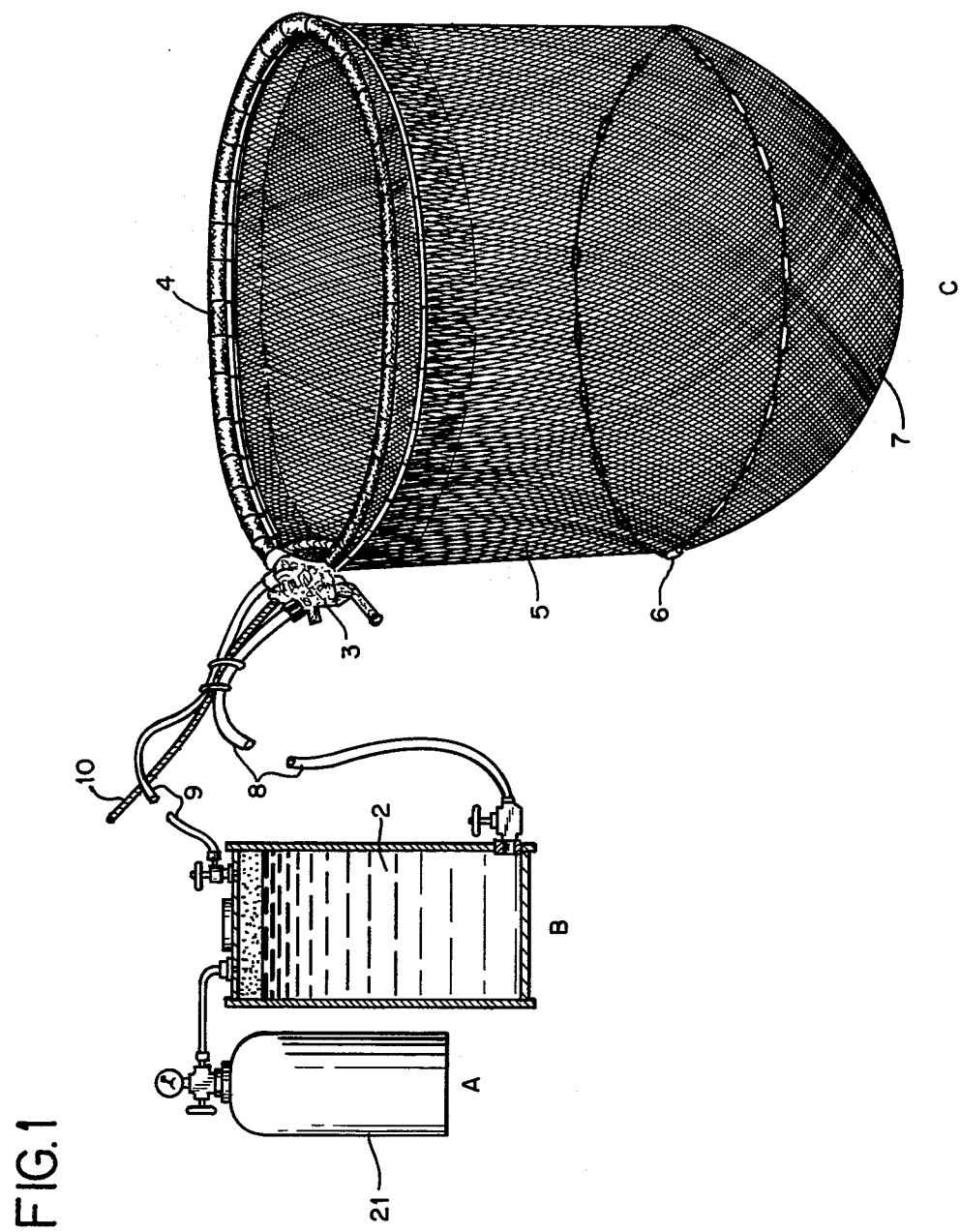
FIG. 1 is the pictorial view of the fishing device of this invention.

Referring now to the different views of the drawings, there is shown a fishing device 1 comprising a cup-shaped or cylindrical fishing net 5 with a closed bottom and opened mouth that is attached to a collapsible tube 4 by means of a plurality of rings 16 held in a suspended manner by means of a plurality of hooks 15 that are attached to the collapsible tube 4. Through the plurality of rings is also inserted the constricting rope 17 that is adapted to be pulled on the surface by the operator on a boat 20 in order to close the opened mouth of the fishing net 5. The two ends of the collapsible tube 4 are joined together by a tube coupler 3 by means of a pair of coupling fittings 18 and attached to the water hose 8 by means of a water hose connector 13 and to an air hose 9 by means of an air hose connector 11 and the assembled fishing net secured to the boat 20 by means of another rope 10 tied to the ring type anchoring lug 19 on the coupler's body. Attached to the end of the air hose 9 may be an air-compressor A (FIG. 2) or an air tank 21 (FIG. 1) and to the water hose 8 is connected to a water tank 2 (FIG. 1) or a water pump B (FIG. 2) that are both driven by an internal combustion engine 22 or an electric motor powered by the boat's electrical power. Also placed on the tube coupler 3 are the air exhaust valve 12 and a pair of liquid exhaust nozzles 14.

Figure 2:
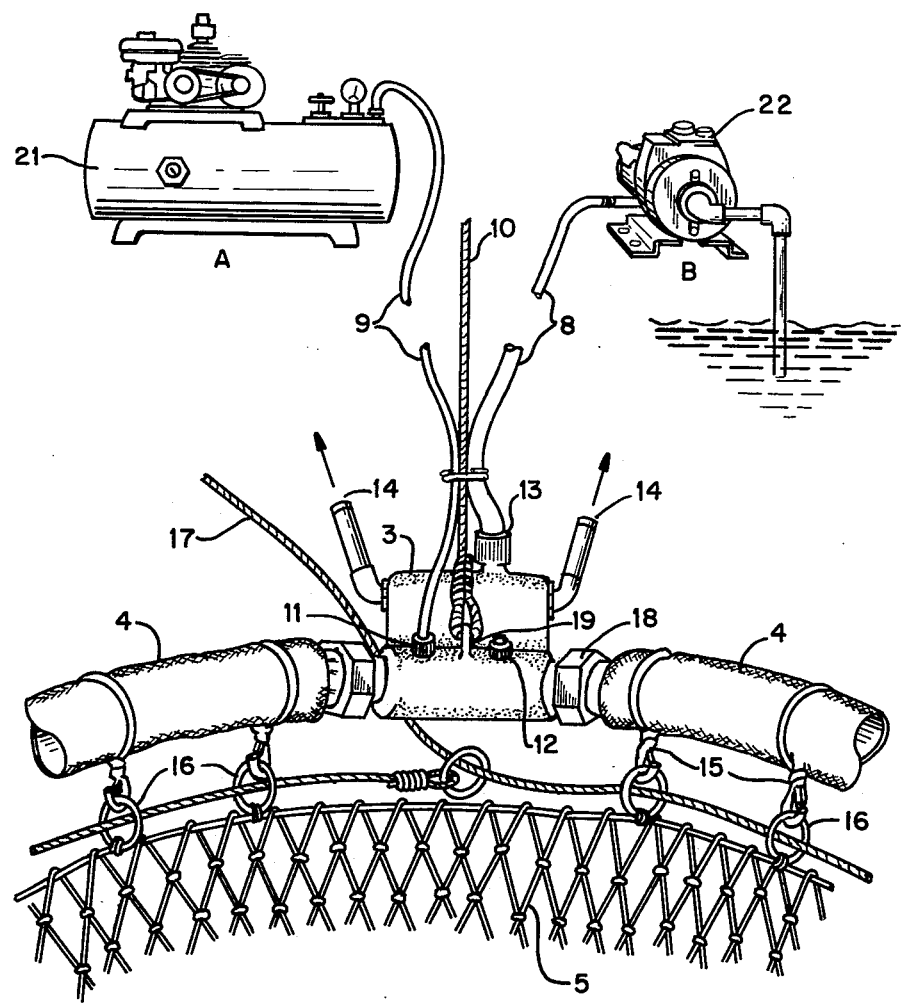
FIG. 2 is the pictorial view of the component parts of the fishing device used by this invention.
Figure 3:
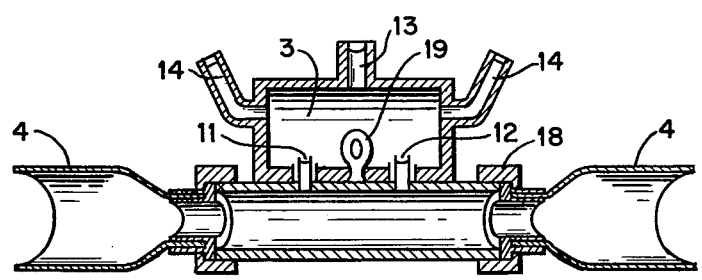
FIG. 3 is the cross-sectional view of the tube coupler showing the air intake port and the liquid discharge port.
Figure 4:
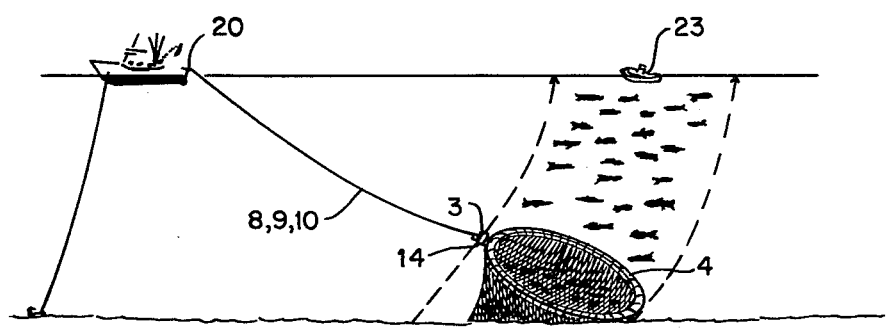
FIG. 4 is the pictorial view of how the fishing device is laid underneath a body of water.

As shown in FIG. 1 of the drawings, the fishing device 1 is operated by means of a portable compressed air tank 21 and a portable water tank 2 that is acted upon by the same compressed air in order to forcibly discharge air to the collapsible tube 4 and water to the pair of liquid discharge outlet or nozzles 14.

in FIG. 3 of the drawings there is shown the cross-sectional view of the tube coupler 3 illustrating how the collapsible tube 4 is connected to the coupler 3 by means of a pair of tube coupling fittings 13. The coupler's body is fitted by a ring type anchoring lug 19 and bored by a pair of holes 11 and 12 which are adapted to serve as an air entry and air discharge port respectively. Attached to the coupler's body is the water hose connector 13 and two curved nozzles 14 are placed in such a position that when pressurized water is forced through, the discharging liquid from said hose 8 will cause said coupler 3 and 4 including the fishing net 5 to be propelled sidewise, as shown in FIG. 4. Said sidewise motion is necessary in order to fully scoop the school of fish underneath the bait boat 23.

Figure 5:
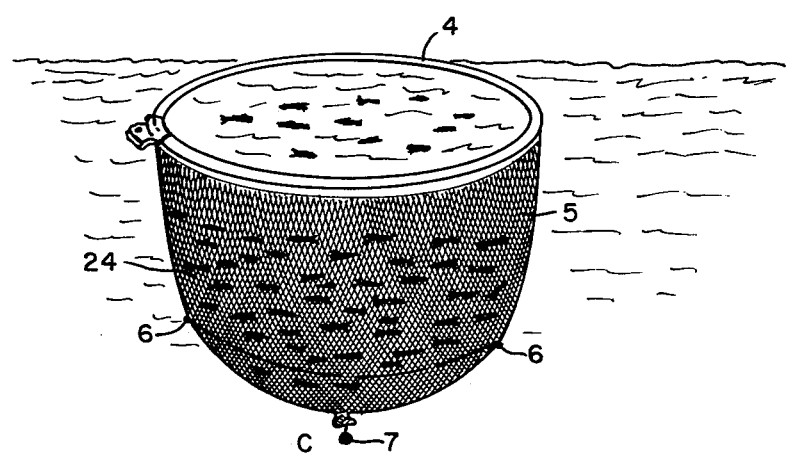
FIG. 5 shows the floatable fishing net when used as a fish storage.

In FIG. 5 of the drawing, the floatable fishing net 5 with closed bottom is utilized as a fish storage 24 by allowing said net 5 to float by closing the air entry and discharge port and the tube coupler 3 after fully inflating said tube 4. Then a plurality of weights or sinkers 6 are placed at the sides of net 5 in order to keep said net taut. To keep the bottom down, another weight or heavier sinker 7 is attached thereby maintaining a cylindrical container with lured fishes.

Figure 6:
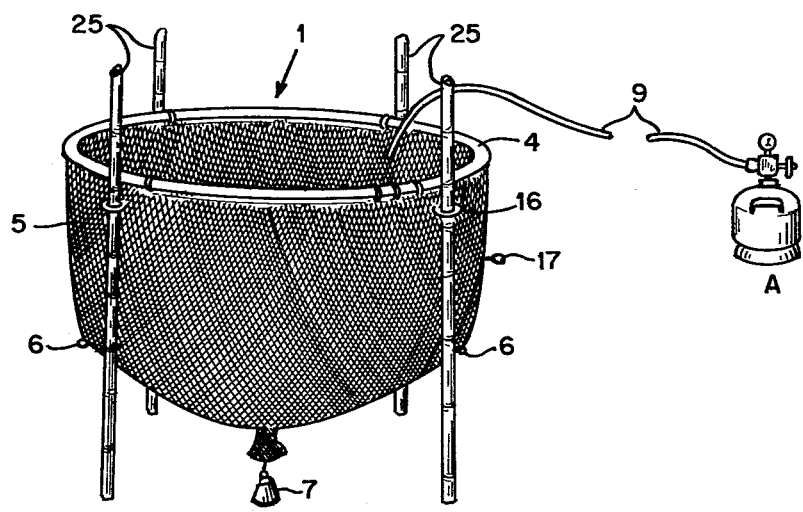
FIG. 6 shows the floatable fishing net when used as a fish fence.
Figure 7:
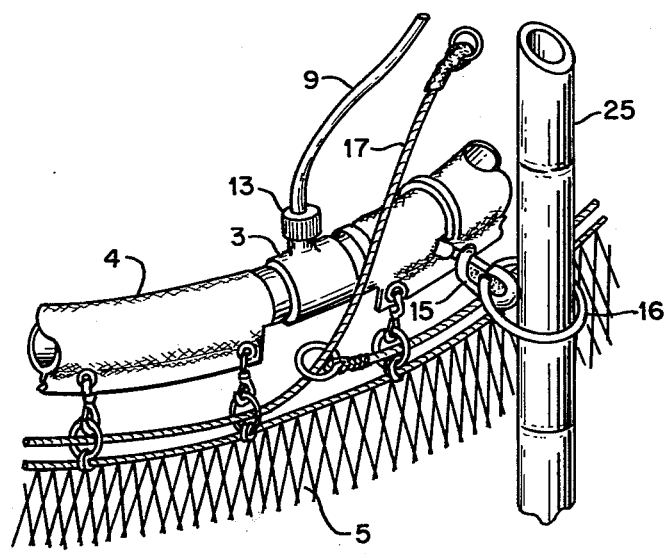
FIG. 7 shows the portion of the fishing net that slides up and down a bamboo anchorage.

In FIGS. 6 and 7 is shown the same fishing net 5 being utilized as a fixed fish fence by providing a plurality of anchorage posts or poles 25 and slidable rings 26 which will facilitate the upward or downward motion of the floating fish net 5.

Figure 8:
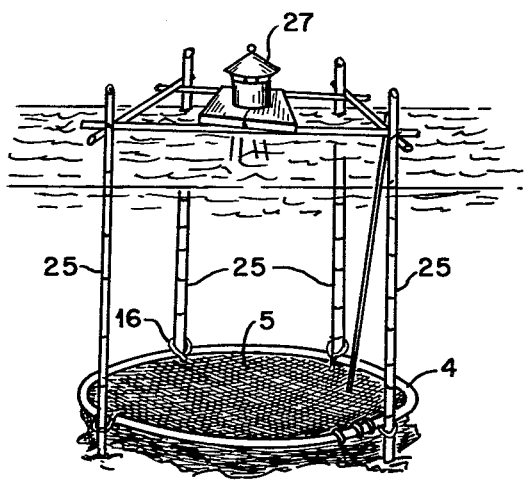
FIG. 8 shows the floatable fishing net in a collapsed or deflated condition when used in conjunction with a lighted fish lure.

In FIG. 8 of the drawing, is shown the collapsible fishing net 5 in a collapsed condition under a lighted fish lure 27 and still guided in its upward movement when inflated by means of a plurality of bamboo poles 25. As soon as the fishes are lured underneath the light 27, the collapsed tube 4 is then inflated with a high pressure air thereby causing said tube to float at a very fast rate and upon surfacing the lured fishes are trapped inside the raised net 5.

The fishing device may be utilized in many other ways, as for example, a trawl net, salambao net, a basnigan net, etc.

OPERATION

The fishing device is first assembled by attaching the opened mouth of the cup-shaped net 5 to the inflatable tube 4 by means of the hooks 15 and rings secured to said tube 4. Then the two ends of the tube 4 are coupled together by means of tube coupler 3 having tube coupling fittings 18. Then the air hose 9 is attached to said coupler 3 by means of the hose connector 11 while the water hose 8 is connected to the same coupler 3 by means of hose connector 13. The net assembly is then provided with a rope 17 that is passed through the plurality of rings 16 around the mouth of the net 5 and looped in order to constrict said mouth of the net 5 where pulled by the operator on the boat 20. To have a means for recovery of the fishing net assembly another rope 10 is tied to the ring 19 on the coupler 3 and attached rigidly on the boat's windlass so that when said windlass is operated said assembly may then be pulled towards the boat. The air hose 9 is then attached to the air tank 21 and the water hose to the water pump or water tank 2. The net assembly is then provided with sinkers 6 on the side and another sinker 7 on the bottom in order to fully submerge the net assembly when deflated at a certain specific depth under water.

The net assembly is then conveyed by boat to a certain area on the sea and then deflated in order to sink at a particular depth underwater. Then on the surface above the net assembly is placed a fish lure such as a fish caller or a bait in the form of fish foods or a lighted lamp of high intensity. As soon as the fishes are accumulated on top of said net assembly the tube is then inflated by a high pressure air thereby causing said tube to be buoyed upward. Simultaneously with the buoying up of the tube the water pump is operated in order to cause said tube to be propelled sidewise until said net assembly totally floats on the surface of the water.

It can be seen that as the wide open mouth of the net floats towards the surface of the water all the fishes on its path of travel are trapped inside said net. The moment the whole net assembly is afloat the rope 17 is then slowly tightened while the tube 4 is slowly deflated up to the point wherein the entire mouth of the net is totally closed. When the net assembly is lifted above the surface of the water the small fishes will freely fall back to the sea due to the size of net openings which satisfy the local regulation as to selectivity of the fishing gear.

Having fully described my invention, what I claim as new is:

1. A fishing device comprising a fishing net having a closed bottom and an opened mouth; an inflatable flexible tube attached to the opened mouth of said net by means of a plurality of hooks and rings; a rope inserted into the plurality of rings that is adapted to close the mouth of said net as soon as a catch is made and said tube deflated; a tube coupler coupled to both ends of the inflatable tube having air and water intake and discharge ports that are adapted to inflate said inflatable tube and propel the inflated tube in order to float to the water surface and to be propelled sidewise; an air compressor attached to said coupler that is adapted to supply the necessary pressurized air to the flexing floatable tube; and a water pump attached to said coupler that is adapted to supply the necessary pressurized liquid in order to propel said floating tube in a sidewise direction.

2. The fishing device as in claim 1 wherein sinkers are attached at the bottom of the net in order to keep the configuration of the net in a taut condition.

3. The fishing device according to claim 1 comprising: a fishing net having a closed bottom with sinkers and an opened mouth; an inflatable tube attached to the opened mouth of said net by a plurality of hooks and rings; and a plurality of anchoring poles placed on the peripheral side of said floatable tube that is adapted to allow the upward and downward movement of said net by means of a plurality of circular rings.

* * * * *